United States Patent
Lieber

(10) Patent No.: US 9,727,453 B2
(45) Date of Patent: Aug. 8, 2017

(54) MULTI-LEVEL TABLE DELTAS

(71) Applicant: Opher Lieber, Kfar Saba (IL)

(72) Inventor: Opher Lieber, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 234 days.

(21) Appl. No.: 13/803,645

(22) Filed: Mar. 14, 2013

(65) Prior Publication Data

US 2014/0281122 A1      Sep. 18, 2014

(51) Int. Cl.
*G06F 12/02* (2006.01)
*G06F 12/0804* (2016.01)
*G06F 12/0893* (2016.01)

(52) U.S. Cl.
CPC ...... *G06F 12/0246* (2013.01); *G06F 12/0804* (2013.01); *G06F 12/0893* (2013.01); *G06F 2212/7203* (2013.01); *G06F 2212/7207* (2013.01)

(58) Field of Classification Search
CPC .......................... G06F 12/0804; G06F 12/0893
See application file for complete search history.

(56) References Cited

U.S. PATENT DOCUMENTS

| | | | |
|---|---|---|---|
| 7,865,658 B2 | 1/2011 | Lasser et al. | |
| 2003/0061450 A1* | 3/2003 | Mosur et al. | 711/135 |
| 2007/0283081 A1 | 12/2007 | Lasser et al. | |
| 2008/0140724 A1* | 6/2008 | Flynn | G06F 1/183 |
| 2008/0147974 A1* | 6/2008 | Madison | G06F 12/0897 711/118 |
| 2008/0209112 A1* | 8/2008 | Yu | G06F 12/0246 711/103 |
| 2009/0172286 A1 | 7/2009 | Lasser et al. | |
| 2010/0017556 A1* | 1/2010 | Chin | G06F 12/0246 711/103 |
| 2010/0174846 A1 | 7/2010 | Paley et al. | |
| 2010/0174869 A1* | 7/2010 | Gorobets et al. | 711/135 |
| 2012/0072652 A1* | 3/2012 | Celis | G06F 12/121 711/103 |
| 2012/0089782 A1* | 4/2012 | McKean et al. | 711/122 |
| 2012/0131265 A1* | 5/2012 | Koltsidas et al. | 711/103 |
| 2012/0137061 A1 | 5/2012 | Yang et al. | |
| 2012/0311269 A1 | 12/2012 | Loh et al. | |
| 2014/0281158 A1 | 9/2014 | Ravimohan et al. | |

* cited by examiner

*Primary Examiner* — Charles Rones
*Assistant Examiner* — Tian-Pong Chang
(74) *Attorney, Agent, or Firm* — Brinks Gilson & Lione

(57) ABSTRACT

A memory system or flash card may include an algorithm or process for managing the handling of large tables in memory. A delta may be used for each table to accumulate updates. There may be a plurality of deltas for a multi-level delta structure. In one example, the first level delta is stored in random access memory (RAM), while the other level deltas are stored in the flash memory. Multiple-level deltas may improve the number of flash writes and reduce the number and amount of each flush to the actual table in flash. The use of multi-level deltas may improve performance by more efficiently writing to the table in flash.

16 Claims, 6 Drawing Sheets

Two Level Delta

Table Write Every: $\dfrac{1}{2}\dfrac{D}{\sqrt{N}}$

Improvement Factor: $\dfrac{\sqrt{N}}{2}$

Figure 7
k-Level Delta
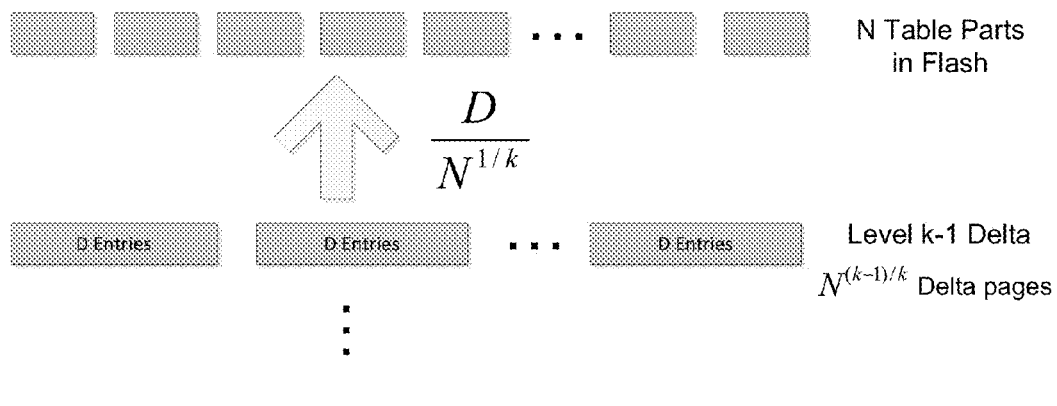
N Table Parts in Flash
$\dfrac{D}{N^{1/k}}$
Level k-1 Delta
$N^{(k-1)/k}$ Delta pages
⋮
Level k=1 Delta
$N^{1/k}$ Delta pages
$\dfrac{D}{N^{1/k}}$
Level k=0 Delta with D entries
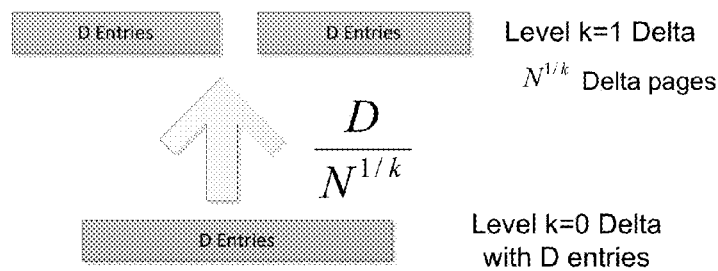
Table-Write Every: $\dfrac{1}{k}\dfrac{D}{N^{1/k}}$
Improvement Factor: $\dfrac{N^{(k-1)/k}}{k}$

MULTI-LEVEL TABLE DELTAS

TECHNICAL FIELD

This application relates generally to memory storage. More specifically, this application relates to table management in non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. The host may write data to the flash memory. Page based flash management algorithms may be used for writing and accessing large tables that include many pages or table parts. An exemplary table may include the logical-to-physical mapping table that may be stored in the flash memory. The table may need to be updated each time a host writes new data. Frequent writing of the table to flash for each host write may result in a poor performance, especially during random-write operations.

SUMMARY

A delta may be used for each table for accumulating updates. The delta may be stored in random access memory (RAM). An improvement of performance and endurance may be achieved with modifications to the delta storage mechanism. In particular, multiple-level deltas may improve the number of flash writes and reduce the number and amount of each flush. A flush may be when an entry from the delta is used to update the actual table in flash. Alternatively, multiple entries from the delta may be used to update a table part in flash depending on a hit-rate of the delta. The first level delta may be stored in RAM, while the other level deltas may be stored in flash. In alternative embodiments, there may be more or fewer deltas stored in the RAM or flash. The first level delta may be stored in RAM and flash, such that it is periodically written to flash from RAM in order to be able to recover it after a power cycle. Further, the other level deltas stored in flash may be cached in RAM to avoid additional control read penalties. The use of multi-level deltas may improve performance by more efficiently writing to the table in flash.

BRIEF DESCRIPTION OF THE DRAWINGS

FIG. 7 is a block diagram of an exemplary memory system with a multi-level delta.

BRIEF DESCRIPTION OF THE PRESENTLY PREFERRED EMBODIMENTS

A multi-level delta memory structure may be utilized for improved memory handling of tables. In one embodiment, deltas may be useful for large tables. For example, each host write may require an update to the logical-to-physical mapping table. The table may be chunked into a plurality of table parts. For example, a 1 megabyte (MB) table may have a flash page size of 16 kilobytes (kb), which means that the table is broken into 64 table parts. Every update to the table may result in a flash write, so the delta accumulates updates before writing to the table. When the delta is full, it may be "flushed" in which the table is updated in the flash. A delta may also be referred to as a list or as an update page. The system described below utilizes one or more additional delta levels to the RAM delta, which may improve the write speed of updates to tables in flash. The updates are in the delta and the actual contents of the table are written in flash for each of the table parts. In one embodiment, the flushing process (when the delta is full) includes selecting table parts with the most updates to be flushed.

Figure 1:
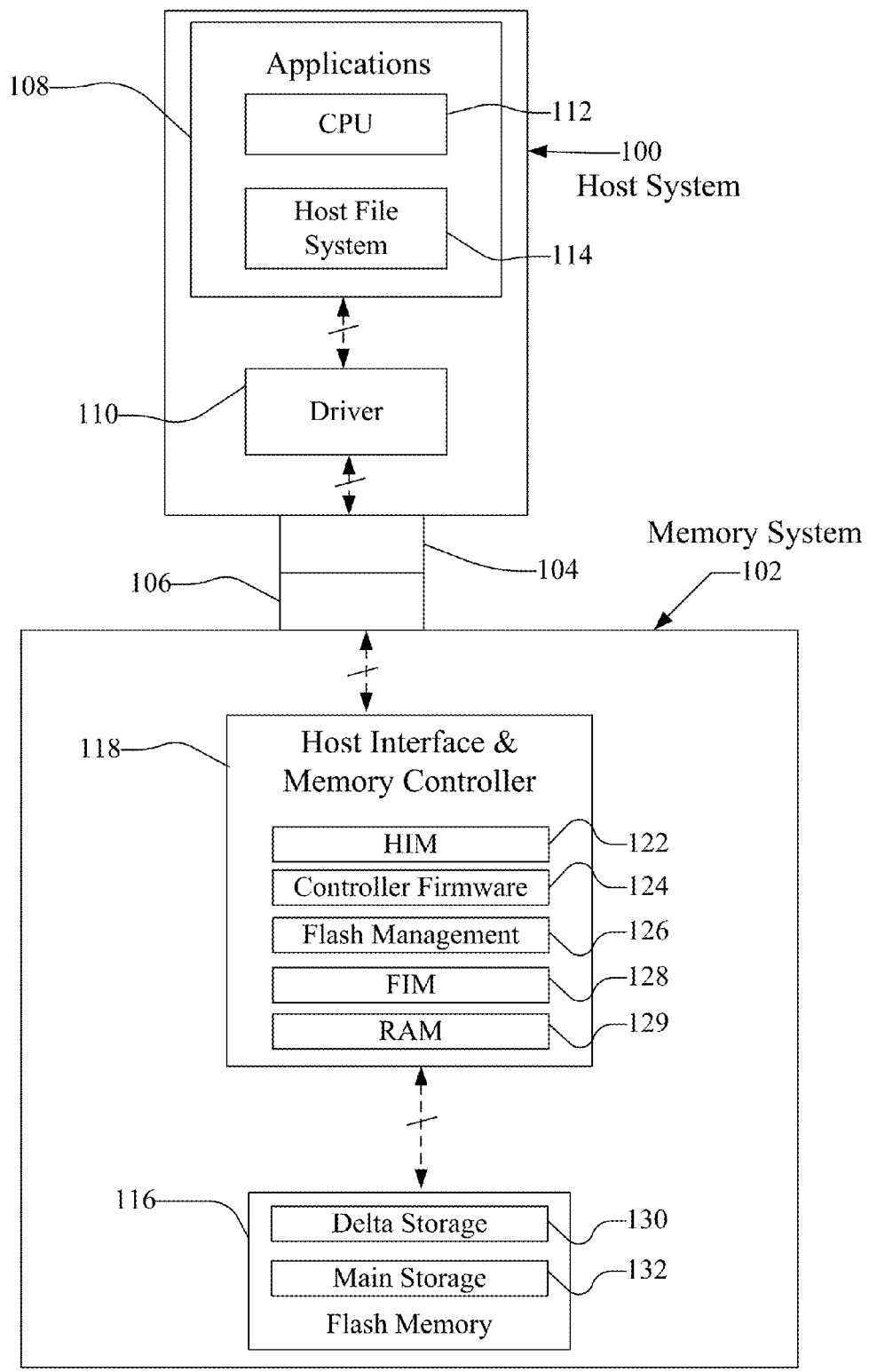
FIG. 1 is a block diagram of a host connected with a memory system having non-volatile memory.

A flash memory system suitable for use in implementing aspects of the multi-level delta is shown in FIGS. 1-5. A host system 100 of FIG. 1 stores data into and retrieves data from a flash memory 102. The flash memory may be embedded within the host, such as in the form of a solid state disk (SSD) drive installed in a personal computer. SSD may be any solid state disks such as NAND gate flash memory, NOR gate flash memory, or any other nonvolatile solid state memories that may have a relatively limited life time due to wearing caused by write operations. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives. As described, flash memory may refer to the use of a negated AND (NAND) cell that stores an electronic charge.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory device 102 is concerned, made up of a combination of circuitry and software. An applications portion 108 and/or a driver portion 110 may interface with the memory device 102. There may be a central processing unit (CPU) 112 and a host file system 114 implemented in hardware and the driver is implemented by firmware. In a PC, for example, the applications portion 108 is implemented in hardware that may include a processor 112 for running word processing, graphics, control or other popular application software. In a camera, cellular telephone or other host file system 114 that is primarily dedicated to performing a single set of functions, the applications portion 108 may be implemented in hardware for running the software that operates the camera to take and store pictures, the cellular telephone to make and receive calls, and the like.

The memory system 102 of FIG. 1 may include non-volatile memory, such as flash memory 116, and a device controller 118 that both interfaces with the host 100 to which the memory system 102 is connected for passing data back and forth and controls the memory 116. The device controller 118 may convert between logical addresses of data used by the host 100 and physical addresses of the flash memory 116 during data programming and reading. Functionally, the device controller 118 may include a host interface module (HIM) 122 that interfaces with the host system controller logic 110, and controller firmware module 124 for coordinating with the host interface module 122, flash interface module 128, and flash management logic 126 for internal memory management operations such as garbage collection, and one or more flash interface modules (FIMs) 128 to provide a communication interface between the controller with the flash memory 116. The device controller 118 may include random access memory (RAM) 129 in which certain data is temporarily stored. As described below, one more levels of delta storage may be in the RAM 129.

A flash transformation layer ("FTL") or media management layer ("MML") may be integrated in the flash management 126 and may handle flash errors and interfacing with the host. The FTL may be responsible for the internals of NAND management. In particular, the FTL may be an algorithm in the memory device firmware which translates writes from the host 100 into writes to the flash memory 116. The FTL may be needed because: 1) the flash memory may have limited endurance; 2) the flash memory 116 may only be written in multiples of pages; and/or 3) the flash memory 116 may not be written unless it is erased as a block. The FTL understands these potential limitations of the flash memory 116 which may not be visible to the host 100. Accordingly, the FTL attempts to translate the writes from host 100 into writes into the flash memory 116.

In one embodiment, the flash memory 116 may be considered to include a main storage memory 132 and a delta storage memory 130. For simplicity, the delta storage 130 may be referred to as a specialized portion of the flash memory 116 while the remainder of the flash memory 116 may be the main storage 132. As described below, the delta storage 130 may be part of the flash memory 116, or may be part of the RAM memory 129. Alternatively, one or more levels of the delta may be in RAM, while the remaining levels of the delta are part of the flash memory 116 as delta memory storage 130. There may not be a physical partition in the flash memory 116 for the delta storage 130 as shown in FIG. 1, which is merely illustrating that one or more levels of the multi-level deltas may be stored in flash memory 116. In alternative embodiments, the one or more of the levels of delta storage 130 may be single level cell (SLC) memory, while the main memory storage 132 may be MLC memory. As described certain of these types of memory may be included as part of the device controller 118 rather than as part of the flash memory 116 (e.g. the one more delta levels in RAM). The multi-level deltas are further illustrated in FIG. 3 and further described below with respect to FIGS. 6-7.

Each new write from the host 100 may update the delta. The host data in the flash memory may include metadata information which can be used to rebuild the delta during initialization. When the delta is full, it may be "flushed" in which the table is updated in the flash. The flush process may include: 1) select the table-part which has the most entries represented in the delta; 2) write all the selected delta updates to the table-part in the flash; and 3) write the delta itself to flash. If the table includes N actively-accessed table-parts in the flash, and the delta has D entries, then on average each active table-part has D/N entries in the delta. The amount of entries flushed may then be on the order of D/N each time. This may be referred to as the "hit-rate" of the delta. In other words, the table is being effectively written once every D/N updates that are received. When N is large (e.g. larger than D) there may be inefficient delta flushing. As described, the multi-level delta structure may provide efficiencies with larger improvements when N is larger than D.

In one embodiment, the number of delta levels may be established in firmware at initialization. Alternatively, the number of delta levels may be dynamic and change. For example, depending on the size of the table and the number of table-parts being used for the table, the number of delta levels may increase or decrease dynamically based on a calculation, such as the improvement factor discussed below with respect to FIG. 7. As described, the delta levels may be viewed as reserved pages in either RAM or flash that are reserved specifically for including table updates. The reserved space may be established initially or may be dynamically modified. The reserved space may not be physical space, but may be logical space (e.g. a certain number of pages that are logically rather than physically related).

Figure 2:
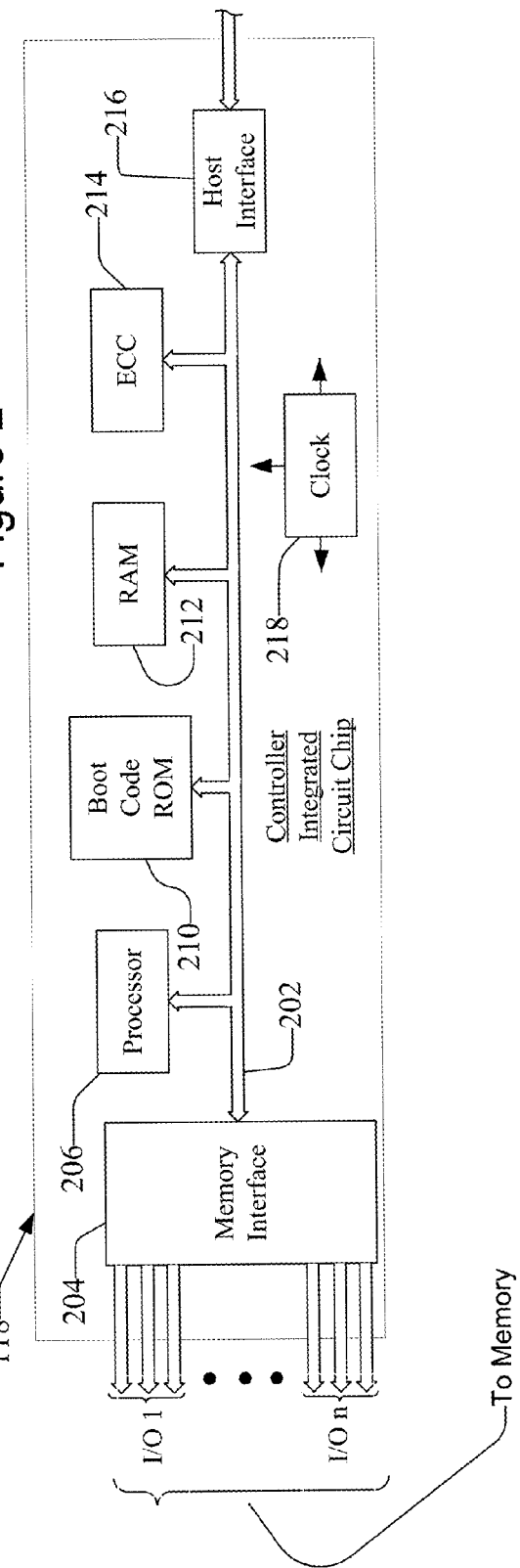
FIG. 2 is a block diagram of an exemplary flash memory device controller for use in the system of FIG. 1.

The device controller 118 may be implemented on a single integrated circuit chip, such as an application specific integrated circuit (ASIC) such as shown in FIG. 2. The processor 206 of the device controller 118 may be configured as a multi-thread processor capable of communicating via a memory interface 204 having I/O ports for each memory bank in the flash memory 116. The device controller 118 may include an internal clock 218. The processor 206 communicates with an error correction code (ECC) module 214, a RAM buffer 212 (which may be the RAM 129 illustrated in FIG. 1), a host interface 216 (which may be the HIM 122 illustrated in FIG. 1), and boot code ROM 210 via an internal data bus 202.

The host interface 216 may provide the data connection with the host. The memory interface 204 may be one or more FIMs 128 from FIG. 1. The memory interface 204 allows the device controller 118 to communicate with the flash memory 116. The RAM 212 may be a static random-access memory ("SRAM"). The ROM 210 may be used to initialize a memory system 102, such as a flash memory device. The memory system 102 that is initialized may be referred to as a card. The ROM 210 in FIG. 2 may be a region of read only memory whose purpose is to provide boot code to the RAM for processing a program, such as the initialization and booting of the memory system 102. The ROM may be present in the ASIC rather than the flash memory chip.

Figure 3:
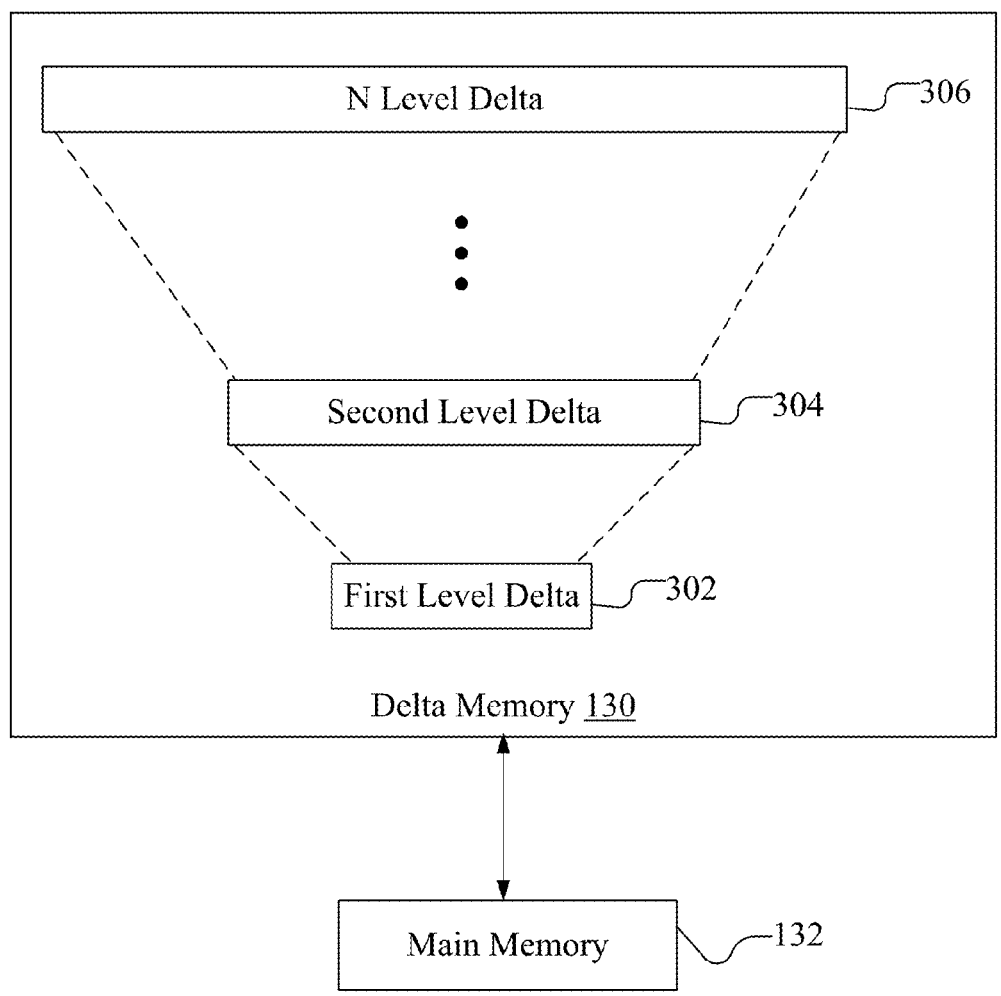
FIG. 3 is a block diagram of an exemplary memory system.

FIG. 3 is a block diagram of an alternative arrangement of the flash memory 116. In particular, the flash storage 116 may include a main memory 132 which may be just referred to as the flash memory as opposed to the delta memory 130, which includes multiple levels of delta storage, such as the first level delta 302, the second level delta 304, and up to an "N" level delta 306. Alternatively, the main memory storage 132 may be the location of the table that is being stored and for which the delta is used for the updates to that table. As described, the N value for the number of levels of delta memory may be two or more. The delta memory 130 may include multiple levels of delta storage. One or more of the deltas may be present in RAM rather than as part of the flash memory 116. For example, the embodiment illustrated in FIG. 3 may be modified such that the first level delta 302 is part of the RAM, while the remaining levels of delta storage are part of the flash memory 116. The levels of delta storage are further described with respect to FIGS. 6-7.

Figure 4:
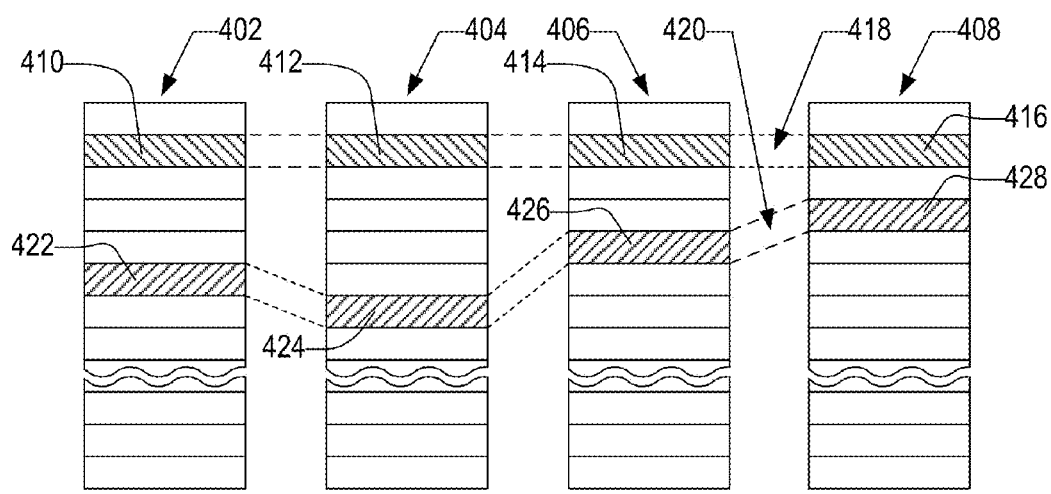
FIG. 4 is an example physical memory organization of the system of FIG. 1.

FIG. 4 conceptually illustrates an organization of the flash memory 116 (FIG. 1) as a cell array. The flash memory 116 may include multiple memory cell arrays which are each separately controlled by a single or multiple memory controllers 118. Four planes or sub-arrays 402, 404, 406, and 408 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 4 by rectangles, such as blocks 410, 412, 414, and 416, located in respective planes 402, 404, 406, and 408. There can be any number of blocks in each plane.

The block of memory cells is the unit of erase, and the smallest number of memory cells that are physically erasable together. For increased parallelism, however, the blocks may be operated in larger metablock units. One block from each plane is logically linked together to form a metablock. The four blocks 410, 412, 414, and 416 are shown to form one metablock 418. All of the cells within a metablock are typically erased together. The blocks used to form a metablock need not be restricted to the same relative locations within their respective planes, as is shown in a second metablock 420 made up of blocks 422, 424, 426, and 428. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
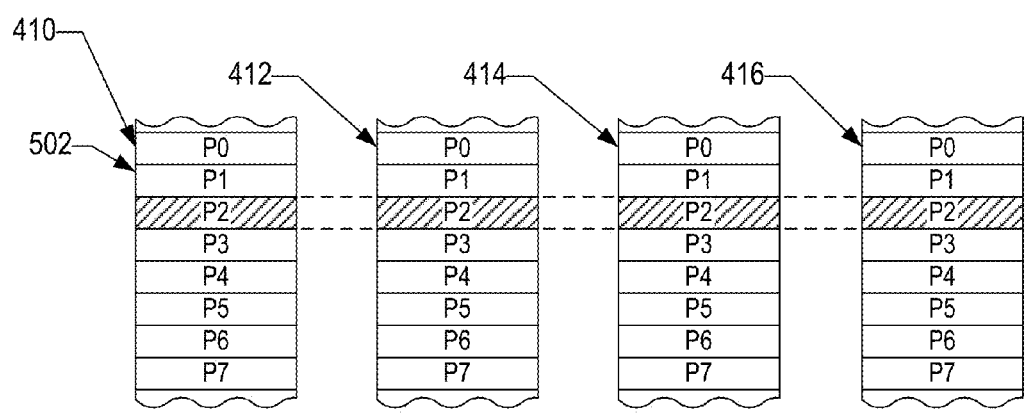
FIG. 5 is an expanded view of a portion of the physical memory of FIG. 4.

The individual blocks are in turn divided for operational purposes into pages of memory cells, as illustrated in FIG. 5. The memory cells of each of the blocks 410, 412, 414, and 416, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 502 is illustrated in FIG. 4, being formed of one physical page from each of the four blocks 410, 412, 414, and 416. The metapage 502, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material. In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Referring back to the multi-level delta memory structure illustrated in FIG. 3, a delta memory may be considered to be a temporary storage for updates to a table. The table can be updated when the delta is flushed. Generally, delta encoding may be thought of as a process by which many data blocks can be represented as smaller deltas with respect to one or more reference pages. Large files and/or collections of files may have strong content locality due to data redundancy, so the use of deltas may help eliminate storing redundant data through delta encoding. As described herein, the multi-level delta memory structure may be used for updating of large tables in memory, such as the logical-to-physical mapping table. The updates to the table may be written to the delta first and later flushed to update the actual table in flash memory. A delta may include logical to physical mapping for data written to update blocks (where update block data is later written to the flash memory). This data may remain in the delta after the block is no longer an update block (the update block data is written to flash).

When the delta is full, it may be "flushed" in which the table is updated in the flash. The flush process may include: 1) select the table-part which has the most entries represented in the delta; 2) write all the selected delta updates to the table-part in the flash; and 3) write the delta itself to flash. If the table includes N actively-accessed table-parts in the flash, and the delta has D entries, then on average each active table-part has D/N entries in the delta. The amount of entries flushed may then be on the order of D/N each time. This may be referred to as the "hit-rate" of the delta. In other words, the table is being effectively written once every D/N updates that are received. When N is large (e.g. larger than D) there may be inefficient delta flushing.

Figure 6:
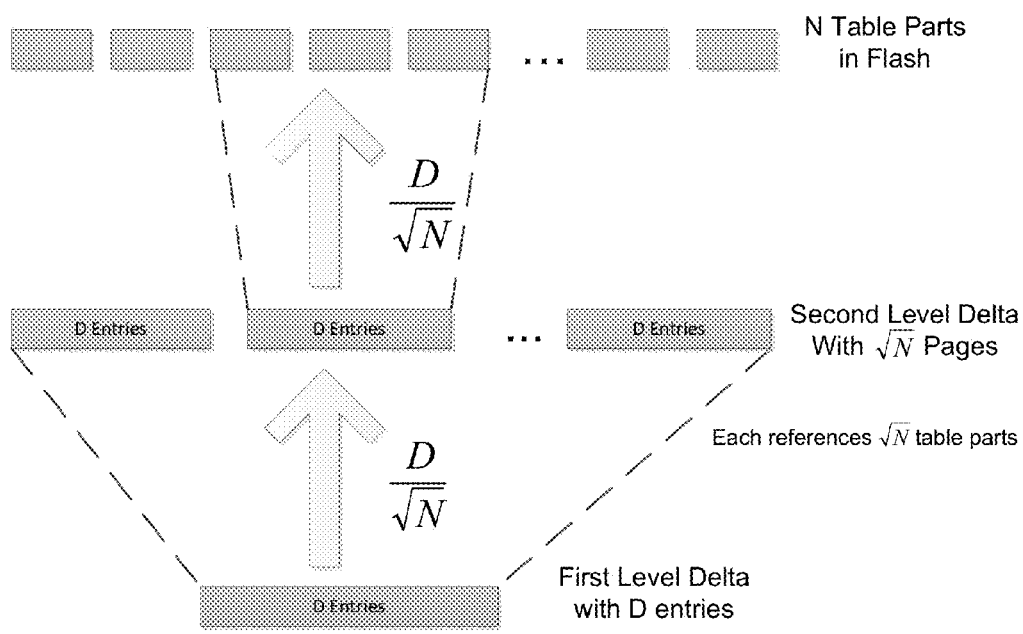
FIG. 6 is a block diagram of an exemplary memory system with a two level delta.

FIG. 6 is a block diagram of an exemplary memory system with a two level delta. In one embodiment, the first level delta with D entries may be stored in RAM, while the second level delta with $\sqrt{N}$ pages is stored in the flash. This second level may be much larger than the first level delta, but may be much smaller than the actual table, which is illustrated as having N table parts in the flash. The second-level delta may be split into parts/pages in the flash memory. For simplicity each second-level delta-page may be assumed to have D entries each (as with the first level delta), but this is not necessary and the number entries for each page from the second level delta may be more or less than the number of entries for the first level delta. With the parameters illustrated in FIG. 6, the optimal size for the second-level delta may be $\sqrt{N}$ pages of D entries each, where each such page maintains updates for a fixed portion of the N table pages. When the first level delta is full, a second level delta page is chosen based on which page has the most entries already represented in the first level delta and they are flushed to the second level delta. When a second level delta-page fills up, the table-page which has the most entries in the relevant second level delta-page may be selected for flushing. Accordingly, each second-level delta page references $\sqrt{N}$ of the table pages and there are $\sqrt{N}$ such second level delta pages. The hit-rate between the first level delta and the second level deltas may be $D/\sqrt{N}$. The hit-rate between the second level delta and its table pages may also be $D/\sqrt{N}$. Accordingly, the flushing of deltas may occur every $D/\sqrt{N}$ updates (as compared with D/N for a single level delta). The total improvement factor may therefore be $\sqrt{N}/2$.

As one example, assume a logical to physical table may include 4000 table parts. The two level delta would result in an improvement factor of around 31 which means that the table is written to 31 times less than with a single level delta. The penalty for the fewer writes is an additional control read when the table is read, since the second-level delta will also need to be read if the second level-delta is in flash. However, there may be a configuration where the second-level delta is in RAM (e.g. the second-level delta is cached in RAM) in which case this penalty may not exist.

FIG. 7 is a block diagram of an exemplary memory system with a multi-level delta. In particular, FIG. 7 illustrates a k level delta, where k=2 or more. The example of k=2 is illustrated in FIG. 6. As shown in FIG. 7, the first level delta (e.g. the RAM delta) may be labeled as the k=0 delta level. The second level of delta may be the k=1 delta. The levels of delta may go up to the $k^{th}$ level, which is actually the level k minus one ("k−1") delta. In other words, the k=0 delta level is the RAM delta and there are up to k−1 delta levels in addition to the RAM delta. For simplicity, the number of delta pages at level i may be $N^{i/k}$ pages. For example, when I=k−1 (level k−1), the number of delta pages may be $N^{(k-1)/k}$. In alternative embodiments, different numbers of delta pages may be utilized for different levels. Generally, the number of pages may increase for each subsequent level. The hit rate between each level may be $D/(N^{(1/k)})$, and the overall factor with k delta levels may be up to $[N^{(k-1)/k}]/k$.

In one embodiment, an optimal k may be calculated based on the value of N. For example, when N=4000 the optimal k may around 8 which results in an improvement factor of around 180 times. In addition, if D is also assumed to be 4000, then a single delta mechanism would write to the table for every host-write, while with an 8 level delta, the table is only written to about every 180 host writes on average. As mentioned, the additional delta levels may require the reading of an additional k pages when accessing the table.

Accordingly, the use of multi-level deltas may be particularly effective when dealing with tables which are written often, but not read often. The physical-to-logical table or bitmap may require frequent writing and may benefit from multi-level deltas. The physical-to-logical table may have a write range that is the entire table while its read-frequency is low or negligible. Likewise, the logical-to-physical table can benefit from multi-level deltas when the host's read range may be cacheable in RAM. Further, the logical-to-physical table can benefit from multi-level deltas when random write may be utilized more frequently or may be of higher importance than random read.

Utilizing a two level delta or a multi-level delta may reduce the write frequency of a table. In particular, the write frequency may be reduced by a significant factor in random write scenarios. Each level of the delta may be used with existing delta implementations/structures. The internal implementation, representation, and/or manipulation of each delta may be the same as or similar to the RAM delta. The host data in flash may include metadata information which can be used to rebuild the delta during initialization.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. A memory device comprising:
a non-volatile storage having a delta storage and a main storage; and
a controller in communication with the non-volatile storage, the controller is configured for:
storing a first level delta in random access memory (RAM);
storing a second level delta stored in the delta storage and a third level delta also stored in the delta storage;
wherein updates to a table in the main storage are first stored in the first level delta before being flushed to the second level delta before being flushed to the third level delta and before being flushed to the table.

2. The device of claim 1 wherein the non-volatile-storage comprises a flash memory and delta levels other than the first level delta are stored in the flash memory.

3. The device of claim 1 wherein the second level delta is larger than the first level delta and the third level delta is larger than the second level delta.

4. The device of claim 3 wherein the controller includes additional delta levels that are successively larger than the third level delta, wherein the third level delta flushes to a fourth level delta and the highest level delta flushes to the table.

5. A flash memory device comprising:
a non-volatile storage having a delta memory and a main memory with an array of memory blocks storing data; and
a controller in communication with the non-volatile storage, the controller is configured for:
utilizing a plurality of delta levels for storage of a table in the non-volatile storage, wherein a first level of the delta levels is stored in random access memory (RAM) and subsequent delta levels stored in the delta memory are successively larger; and
flushing table updates through the delta levels before updating the table.

6. The device of claim 5 wherein the non-volatile storage comprises a flash memory.

7. The method of claim 6 wherein the delta levels other than the first level are stored in the flash memory.

8. The device of claim 5 wherein the table updates are flushed from the first level delta to another of the delta levels when the first delta level is full.

9. The device of claim 5 wherein the first delta level includes the fewest entries of the delta levels.

10. A method for writing a table in a flash memory device comprising:
in a flash memory comprising delta memory and main memory, and having a controller, the controller:
receives a write request for updating the table;
accumulates updates from the write request in a first level delta;
flushes a portion of the updates from the first level delta to a second level delta in the delta memory when the first level delta is full, wherein the portion of the updates that are flushed is based on which pages have the most entries in the first level delta; and
flushes the portion of the updates from the second level delta to the table in the main memory;
wherein the controller includes additional delta levels in the delta memory that are successively larger than the second level delta.

11. The method of claim 10 wherein the flushing to the table is based on which table pages have the most entries already represented in the second level delta.

12. The method of claim 10 wherein the updates are flushed from the second level delta to the table when the second level delta is full.

13. The method of claim 10 wherein the second level delta is larger than the first level delta.

14. The method of claim 10 wherein the second level delta flushes to a third level delta and the highest level delta flushes to the table.

15. The method of claim 10 wherein the flash memory comprises non-volatile storage for both the delta memory and the main memory.

16. The method of claim 15 wherein the first level delta is stored in random access memory (RAM) and the second level delta is stored in the delta memory of the flash memory.

* * * * *